United States Patent [19]
Schlaudt et al.

[11] 3,766,642
[45] Oct. 23, 1973

[54] PROCESS FOR PREPARING A DUCTILE METAL FERRITE

[75] Inventors: Charles M. Schlaudt, Berkeley; Ronald L. Clendenen, Orinda; Eugene E. Olson, Oakland, all of Calif.

[73] Assignee: Shell Oil Company, New York, N.Y.

[22] Filed: Sept. 27, 1971

[21] Appl. No.: 183,894

[52] U.S. Cl.............. 29/420.5, 29/608, 252/62.58, 252/62.63
[51] Int. Cl............................................. B22f 3/24
[58] Field of Search................ 29/608, 420, 420.5; 252/62.58, 62.63

[56] References Cited
UNITED STATES PATENTS

| | | | |
|---|---|---|---|
| 3,458,927 | 8/1969 | Wiechec | 29/608 |
| 2,762,778 | 9/1956 | Gorter et al. | 29/608 UX |
| 3,341,940 | 9/1967 | Tomholt et al. | 29/420 S X |
| 3,625,898 | 12/1971 | Nijmegen | 252/62.58 |

Primary Examiner—Charles W. Lanham
Assistant Examiner—D. C. Reiley, III
Attorney—Martin S. Baer and Howard W. Haworth

[57] ABSTRACT

Oriented lead ferrites which yield superior ceramic permanent magnets are produced by the four-step process of a. preparing small particles of agglomerated less than 0.1 micron grains of ferric oxide and lead oxide, b. maintaining the particles of agglomerated oxides at temperatures of from about 700°C to 1,000°C for up to about 24 hours to cause the oxides to react (ferritize) and form less than 0.5 micron diameter crystallites of lead ferrite, c. sintering the crystallites into a solid body either by maintaining them at from 750°C to 1,000°C for not more than 2 hours, or preferably by maintaining them at from 700°C to 1,000°C while applying pressure, and d. hot forging the body by applying pressures of up to about 30,000 psi at temperatures of from 700°C to 1,050°C.

8 Claims, 1 Drawing Figure

3,766,642

PROCESS FOR PREPARING A DUCTILE METAL FERRITE

BACKGROUND OF THE INVENTION

1. Field of the Invention

This invention relates to the production of highly oriented lead ferrites which form excellent permanent magnets.

The novel oriented lead ferrites exhibiting superior physical and magnetic properties produced by the instant multi-step process are disclosed and claimed in our copending patent application Ser. No. 183,895, filed Sept. 27, 1971.

2. The Prior Art

Metal ferrites having a formula $PbO \cdot nFe_2O_3$ wherein $n$ has a value of about 6, are known to yield permanent magnets.

Conventionally ferrite magnets are prepared by an involved multi-step process. First, the iron and lead oxides are calcined and reacted together to form a solid ferrite body. This is a relatively hazardous process since at the temperatures employed lead oxide which may be present is volatilized. The resulting ferrite body is then ground up and ball milled into a fine powder. This powder is slurried in liquid and the slurry is placed in a magnetic field which orients the individual ferrite particles. While still aligned in the magnetic field, the slurry of particles is wet-pressed to form a compacted solid of oriented particles. This solid is dried and then thoroughly sintered. Here, again, the sintering temperature can lead to hazardous lead volatilization and make it difficult to control stoichiometry. Finally it is magnetized to give the final ceramic magnet product. This process has several other disadvantages. In addition to being complicated, it also does not produce magnets having optimum magnetic properties (remanences and coercive forces), since it does not produce a fully oriented material made up of uniform small crystallites.

Both a desirable small particle size and a full orientation cannot be achieved using conventional techniques for two reasons: (1) orientation during wet-pressing requires large (2 micron or larger) particles to be fully effective, thus either orientation or particle size with their associated magnetic properties must be sacrificed; and (2) is impossible to both restrain grain growth during sintering and achieve desired high densities.

It has recently been proposed to effect crystallite orientation by heating and pressing a conventionally prepared solid ferrite (R. M. Haag Annual Report March 1969–March 1970, concerning Office of Naval Research Contract N00014–68–C–0364). While in part successful, this process as practiced heretofore has not produced materials which yield better magnets than those conventionally made.

STATEMENT OF THE INVENTION

It has now been found that lead ferrite ceramic permanent magnets having both small uniform grain size and full crystallographic orientation and thus both high coercive forces and remanences are prepared safely by a hot forging process carried out under certain controlled conditions. The overally process comprises the steps of:

a. preparing small solid particles which themselves comprise an intimate mixture of agglomerated less than 0.1 micron diameter grains of ferric oxide and lead oxide;

b. maintaining the particles of agglomerated oxides at temperatures of from 700°C to 1,000°C for up to about 24 hours to effect at least a partial chemical reaction between the mixed metal oxides (ferritization) to form less than 0.5 micron diameter crystallites of lead ferrite;

c. sintering the at least partially ferritized particles into a solid body either by maintaining them at 750°C to 1,000°C for not more than 2 hours at ambient pressure or preferably by maintaining them at 700°C to 1,000°C while applying a pressure of up to about 30,000 psi; and d. heating and pressing (hot forging) the resulting sintered body at 700°C to 1,050°C and 1,000 psi to 30,000 psi to essentially completely densify it, if necessary to completely ferritize it, and to deform it and thus align its magnetic crystallites.

The products of this invention may then be magnetized by conventional means to give permanent magnets.

Magnets produced by this process are characterized as having better combined magnetic properties, that is higher remanences and coercive forces than possible in lead ferrite magnets produced heretofore.

Definition of Terms

As this invention is directed to a process for preparing magnets having improved properties, for the sake of completeness it is desirable at this point to set out precisely what these properties are and their importance.

This will be done with reference to FIGURE 1 of the drawing. FIGURE 1 is a graphic representation of the amount of magnetic flux induced in a permanent magnet material when it is exposed to a varying magnetizing-demagnetizing field. It is in the form of two quadrants of an intrinisic hysteresis loop. FIGURE 1 also contains a portion of the normal hysteresis loop for the same material.

A sample of unmagnetized material by definition has no induced flux at 0 field and thus is at point 0 in FIGURE 1. As an increasing magnetizing external field (+H) is applied, the flux induced in the sample follows line OW and reaches a constant value referred to as the saturation magnetization ($B_s$). As the positive field is reduced, the flux follows the line WX. The flux remaining when the field has been reduced to zero is termed the remanence ($B_r$). As an increasing demagnetizing external field is applied (−H), the induced flux follows the line XY. The demagnetizing field required to decrease the induced flux to zero is referred to as the intrinsic coercive force ($H_{ci}$) of the material. Alternatively, as the demagnetizing field is increased the normal induced flux will decrease to zero along line XZ. The point at which the normal induction reaches zero is termed the normal coercive force ($H_c$).

As can thus be seen, the resistance to demagnetization which a material possesses is indicated by the intrinsic coercive force, $H_{ci}$. The strength of a magnet is given in part by the value of the remanence. The product of induction and external field as given by the normal demagnetization curve (line XZ) reaches a maximum at some B and H. The value of this product is used as a figure of merit for permanent magnet materials and is referred to as $BH_{max}$ or the energy product. It may be seen from the shape of the curve in FIGURE 1 that the remanence must be equal to or less than the saturation magnetization. The intrinsic coercive force must be greater than or equal to the normal coercive force. It may also be seen that the normal coercive force cannot be larger than the remanence or else the intrinsic induction would increase even though a demagnetizing external field is being applied — a physical impossibility.

These magnetic properties can be related to the chemical and physical properties of the permanent magnet material. The individual metal oxides of the present magnets, ferric oxide and lead oxide, do not alone form permanent magnets. They do, however, react to form ferrites having the formula $PbO \cdot nFe_2O_3$ wherein $n$ is about 6. These compounds are capable of forming permanent magnets. In general terms the saturation magnetization is proportional to the extent of reaction (ferritization) between the oxides.

A ferrite is made up of a plurality of $PbO \cdot 6Fe_2O_3$ crystallites. The magnetic properties of a ferrite are related to the orientation of these crystallites and their size. Each crystallite has an axis of easy magnetization. An ideal individual crystallite when subjected to a magnetic field parallel to this axis exhibits a remanence equivalent to its saturation magnetization. If all the crystallites in an ideal ferrite were perfectly crystallographically oriented so that their axes of easy magnetization would be parallel. Such a ferrite would also have a remanence ($B_r$) along this axis equivalent to its saturation magnetization ($B_s$). The ratio $B_s/B_r$ is one simple measure of the extent of orientation of a ferrite material. A conventional ferrite, without special treatment, has an essentially random crystallite arrangement.

In an ideal ferrite permanent magnet, the crystallites would be uniformly about equal to the size of a magnetic domain, that is, 0.1 to 1 micron. Such a ferrite would have a very high intrinsic coercive force.

DETAILED DESCRIPTION OF THE INVENTION

The Particle Preparation Step

Figure 1:
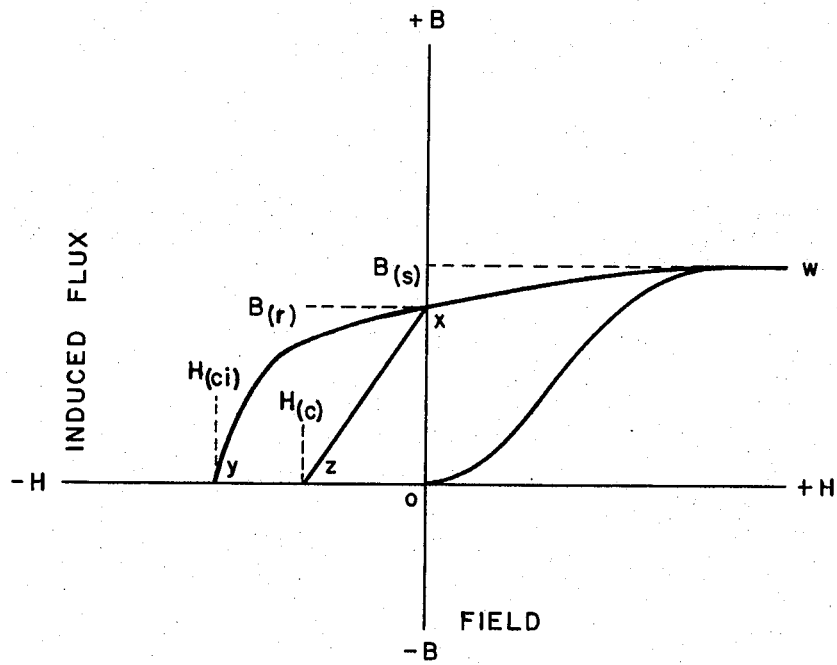

In the first step of this process small solid particles are prepared which comprise a major proportion of ferric oxide and a minor proportion of lead oxide. More particularly, these particles contain from about 3 to about 6.5 moles of ferric oxide per mole of lead oxide. Preferably they contain from about 4.5 to about 6.5 moles of ferric oxide per mole of lead oxide, and most preferably from about 5.0 to about 6.5 moles of ferric oxide per mole of lead oxide. The particles may, if desired, in addition contain minor amounts, for example up to about 10 percent by weight of additives known to be used advantageously in lead ferrite magnets, such as $Bi_2O_3$, $Al_2O_3$, $ZrO_2$, $B_2O_3$, $CaF_2$, $SiO_2$, $SrSO_4$, $BaO$, $SrO$ and $CaSO_4$.

The particles formed in this step are themselves agglomerates of particles of the ferric and lead oxides and additives. With any of these compositions, it is very desirable that these agglomerates be small and it is essential that the particles which make up the agglomerates be very small in size. The agglomerates must be made up of particles of ferric oxide and lead oxide which are less than 0.1 micron in diameter. Excellent results are obtained when the individual oxide particles which make up the agglomerates are less than diameter, micron in diameter. which is about the smallest size which can be readily measured by present techniques.

Suitable agglomerated particles may be produced by several techniques. In one method, for example, they are prepared by coprecipitating a mixture of decomposable compounds of the metals and then thermally decomposing the precipitate. Other techniques include, for example, spray drying or spray roasting a mixed salt solution. These methods all lead to very intimately mixed agglomerates of less than 0.1 micron particles of ferric oxide and lead oxide.

Using the coprecipitation technique, a solution, most conveniently in water, of soluble ferric and lead salts or organic complexes (and optionally additives) is first prepared. Examples of suitable salts include, ferric nitrate, acetate, chlorate, formate, and oxalate; and lead nitrate, nitrite, citrate, and acetate.

The solution of salts is then treated with a precipitating agent which gives a thermally decomposable precipitate. Examples of suitable precipitating agents are hydroxyl ion, carbonate ion, and the like. Preferred precipitating agents are hydroxide ion and carbonate ion in amount of from about one to about 10 times the stoichiometric amount required for precipitation of all the metal ions present.

The amount of soluble metal salts present in the aqueous solution is determined by considering the solubilities of the precipitates to ultimately give the desired ferric oxide to lead oxide molar ratio of about six to one.

The mixed precipitate is separated, rinsed and thermally decomposed in an oxygen-containing atmosphere to give the mixed oxide particles. Generally, an exposure of from about 2 to 36 hours to temperatures in the range of from about 400°C to about 700°C is adequate to carry out the decomposition. Somewhat longer times and higher temperatures may be required with very difficulty decomposed salts; however, long heatings at temperatures of greater than above about 700°C should be avoided.

Using the spray-drying technique, a solution is prepared containing a decomposable ferric salt and a decomposable lead salt in the desired about 3:1 to 6.5:1 molar ratio. Suitable salts include nitrates, carbonates, acetates, chlorates and like materials which decompose when heated in the presence of oxygen. Any additives should also be present in this solution to ensure their ultimate intimate admixture with the principal metal oxides. This solution is atomized into a chamber maintained at an inlet drying temperature in the range of from about 100°C to about 600°C, preferably from about 200°C to 500°C, to form small, dry particles of mixed decomposable salt. These particles are then thermally decomposed in an oxygen-containing atmosphere. This decomposition step is similar to that described with the coprecipitation method of forming particles and requires similar conditions.

Using the spray-roasting technique, a solution of decomposable salts is prepared and atomized into a chamber or fluidized bed having an oxygen-containing atmosphere heated to a temperature in the range of from 500°C to 1,000°C. In one step the particles of mixed decomposable salts are formed and thermally decomposed to mixed oxides.

The Chemical Reaction Step

The particulate solid agglomerates produced in the first step contain essentially distinct grains of ferric oxide, distinct grains of lead oxide and optionally additives. In this step of the process, the particulate agglomerates are heated to a relatively low temperature for a relatively long period to cause these spearate oxide grains to chemically react and form small crystallites of their respective metal ferrite, from which the final ceramic magnets are made. This heating step is known as ferritizing. These ferrite products can be represented by the formula PbO·nFe$_2$O$_3$ wherein $n$ has a value of from 3 to 6.5. The crystallites of ferrite produced in this step must on the average be less than 0.5 micron in diameter. The crystallites are uniform in size, preferably having an average diameter of not greater than 0.2 micron with not more than 10 percent of the crystallites having diameters above 0.5 micron.

It is essential that the temperature and period of the heating of this step be closely controlled. The temperature must be maintained high enough to cause the metal oxides to react with one another and form the desired ferrite crystallites. The temperature must not be substantially above the reaction temperature or else undesired amounts of particle grain growth will occur. It is not necessary that this ferritization be carried to completion. It is very difficult to achieve complete reaction between the oxides without also obtaining some grain growth. It has been found that if ferritization is only partially completed in this step, it can be completed by the heat and pressure employed in the final two steps. When pressure is applied with heat in the forming and forging steps full ferritization is effected at lower temperatures, and thus with far less chance of undesired grain growth. It is preferred to obtain ferritization partially by heating in this step and partially by heating with pressure in the final two steps (forming and forging). Temperatures selected in the range of from 700° to 1,000°C are suitable for full or partial ferritization as are heating periods of from about 0.5 hour to about 24 hours with times of from 0.5 to 8 hours and temperatures of from 750°C to 900°C being preferred.

The times and temperatures for ferritization are critical and depend upon each other and upon the chemical make-up of the oxide mixture. The time ranges and temperature ranges given here, and also given below for the sintering and forging steps are not intended to be mutually extensive, but rather to be related. The lower temperatures given will typically require the longer times given, while the highest temperatures will give best results with the shorter times. The other extremes, for example longest times in combination with highest temperatures, will generally be less suitable. Examples of typical preferred conditions include, heating for from 4 to 24 hours at 700°C, for from 4 to 8 hours at 750°C, for from 2 to 6 hours at 800°C, for from 1 to 4 hours at 850°C and from 0.5 to 2 hours at 900°C. This heating can be carried out in an oxygen-containing atmosphere, very suitably in air. The products of this heating step are the desired fine powders of ferrite crystallites having an average diameter of less than 0.5 micron, sometimes loosely bonded together.

The Sintering Step

The lead ferrite powder next is formed into a compact solid mass. This forming is effected either by tthe application of heat (sintering) or preferably by the application of heat and pressure. This step is required since an essentially solid body must be employed in the hot forging step which follows to prepare the actual magnetizable oriented ceramic material.

In this sintering step the emphasis is on a relatively quick heating of the powder, since the temperatures employed for sintering also promote undesired grain growth. A quick heating permits sintering while minimizing grain growth. Long heatings at relatively low temperatures might be used but pose the hazard of grain growth. Generally up to about 2 hours at 750°C to 1,000°C gives a good sintered product. More specifically, 0.1 to 2.0 hours at 800°C to 900°C are preferred for sintering the lead ferrite crystallities. Examples of preferred time/temperature intering combinations are 1 to 2 hours at 800°C, 5 to 1.5 hours at 850°C, and 0.1 to 1.0 hours at 900°C.

In a preferred method of operation, heat and pressure are both employed to effect compaction and sintering. That is, the powder is hot pressed in a die. The use of pressure permits lower temperatures and/or shorter times to be employed and thus further limits grain growth. Very suitable hot pressing conditions are from 700°C to 1,000°C and from 1,000 psi to 30,000 psi. Use of conditions in this range enable suitable compaction to be effected in a total heating cycle of about 15 minutes or less, preferably 1 to 10 minutes. Best results are obtained when from 800°C to 950°C and from 3,000 psi to 10,000 psi are used to form the compact.

Examples of suitable times, temperatures and pressures to effect pressure sintering are 10 minutes at 850°C and 15,000 psi, 10 minutes at 950°C and 5,000 psi, 3 minutes at 950°C and 20,000 psi, and 1 minute at 1,000°C and 10,000 psi.

The sintering or hot-pressing may be carried out in an oxygen-containing environment (air) in an inert environment (nitrogen) or in a vacuum.

The nature of the product of the sintering (or preferably hot pressing) is critical to the success of this process. To ultimately yield the desired high quality magnets, it is essential that the product of this step be made up of uniform, less than 1 micron diameter crystallites. When heat and pressure are applied in this step the products are more particularly characterized as being solids, having densities of from 80 to 100 percent of the theoretical maximum. When heat alone is applied the products are solids of lower density, generally 40 to 80 percent of the theoretical maximum. These materials must have this lower density because more severe heatings necessary to achieve higher densities also give undesired amounts of grain growth. In this case, full density in addition to crystallite orientation is achieved in the following hot forging step. In both cases the solid products are made up of crystallites having an average diameter preferably less than 0.7 micron, especially from 0.3 to 0.7 micron, and having not more than 10 percent of their diameters greater than 1 micron. When such a product is oriented and if necessary densified in the hot forging step, a superior magnet results. Without further treatment, this product might be useful in low quality crude magnet applications, but would not be suitable as a desirable high quality magnet.

The Hot Forging Step

The uniformly fine grained solid ferrite body formed in the sintering step of this process has the property of being ductile when heated to a temperature approximating its forming temperature. This property is utilized in this step when the body is hot forged to effect full densification and the orientation of ferrite grains essential to the production of an anisotropic permanent magnet. The hot forging is carried out by heating the ferrite body and applying a pressure to it in a manner which deforms it. As in the sintering step, the emphasis is on a rapid treatment with a limited exposure to high temperatures to minimize grain growth. Conditions similar to the hot pressing conditions optionally used to form the solid ferrite body may be used for hot forging. Temperatures of from 700°C to 1,050°C, preferably 750°C to 1,000°C and pressures of from 1,000 psi to 30,000 psi, preferably 3,000 psi to 20,000 psi, are useful, with 800°C to 950°C and 3,000 psi to 10,000 psi being most preferred hot forging conditions. The atmosphere employed during sintering is not critical, air, an inert gas such as nitrogen or vacuum may be used.

The temperature and pressure are most favorably controlled to give a strain rate of from about 1 percent/min to about 500 percent/min. The preferred temperature and pressure conditions noted above fall into this area.

As in the sintering step, it is desirable to make the heating rapid. Preferably the forging period is not more than about 0.5 hours, with times of 0.2 hours or less being preferred, and forging times of from 0.1 minutes to 5 minutes being most preferred.

The amount of forging, that is the amount of deformation, should be controlled. A measure of the deformation is expressed by the ratio $$(L - L_o)/L_o$$

wherein L is the size of the body along the forging axis after forging, and $L_o$ is the size before forging. To achieve the same degree at orientation, non-dense bodies will require different degrees of forging than dense bodies since, in the former, a certain amount of forging will be taken up in the densification process. After the material has been forged to essentially theoretical density, additional forging will produce bulk flow of the material resulting in orientation. The deformation of a body by forging can be approximated by the equation $$(L - L_o)/L_o = (\rho_r - 1) + (L - \rho_r L_o)/\rho_r L_o$$

wherein $\rho_r$ is the density relative to theoretical. The first term in parentheses represents the contribution of densification to forging, and the second term represents the contribution of mass flow. For any given density, the most suitable values for forging, represented by $$(L - \rho_r L_o)/\rho_r L_o$$

will range from 0.1 to 0.9 with values between 0.5 and 0.75 being preferred.

This hot forging of these ductile bodies is not limited by the apparatus employed. It may be carried out in a press, with rollers, or with other means which will enable these ferrite bodies, when heated to a relatively ductile state, to be deformed. This deformation orients the crystal structure of the ferrite such that the axes of easy magnetization of the crystallites are all aligned. When the resulting ferrite, having an aligned structure, is magnetized in a field having the same orientation as the alignment of the axes of easy magnetization a strong permanent magnet is formed.

The product of the hot forging step can if desired be shaped and ground to give useful configurations.

This process has beend escribed as four separate batch-type steps. In some applications it might be of advantage to carry out several of these steps continuously. For example, the heating of the particle forming and the ferritization heating could easily be carried out on a moving belt which passes through two different heating zones. Similarly, the ferritization and sintering steps could be accomplished in two heating zones traversed by a moving oxide mass.

The Metal Ferrite Product

The metal ferrite product of this invention has a formula $PBO \cdot nFe_2O_3$ wherein n has a value of from 3 to 6.5, preferably 5 to 6.5 inclusive. The ferrites may contain minor amounts of added other materials, if desired.

The ferrite products are dense and finely grained, and have high degrees of crystallite orientation. The densities of these ferrites are at least 95 percent, preferably at least 97 percent, and most preferably at least 98 percent of the theoretical maximum. The average crystallite size of these ferrites is less than 2.0 microns, preferably in the range of from 0.5 to 1.5 microns. The crystallites are uniform with not more than 10 percent having diameters of greater than 2.5 microns. The crystallites of these materials are highly oriented. Suitably the crystallites are at least 90 percent oriented (that is, having a $B_r/B_s \geq 0.9$), with orientations of not less than 95 percent being preferred. As pointed out above, this combination of full orientation and small grain size has not been obtained using conventional ferrite-forming processes.

Because of this unique structure, that is a fine grain structure and a high degree of crystallite orientation, these magnets make ceramic magnets which have both high remanences and coercive forces. Lead ferrite magnets made with this invention generally have remanences of greater than 3,700 gauss and normal coercive forces of greater than 2,400 oersteds.

The process of this invention will be further described by the following examples and comparative experiments. These are presented for purposes of illustration and are not intended to limit the scope of this invention.

EXAMPLE I

Preparation of $PbO \cdot 5.8 Fe_2O_3$ Magnet

A. Starting Material Preparation 7,001 grams of $Fe(NO_3)_3 \cdot 9H_2O$ and 498.75 grams at $PB(NO_3)_2$ were dissolved in 13 gallons of water. This solution was dried in a Niro Portable Spray Drier. The inlet temperature was 430°C and outlet temperature was 160°C. The material from the spray drier was placed in ceramic crucibles and heated to 600°C for 15½ hours to remove the nitrates.

B. Ferritization

To ferritize the material, the crubilbes containing the powder were placed in a furnace at 800°C for 4 hours in air. The calcined material was ground or crushed to pass an 80 mesh sieve. This material consisted of less than 0.5 micron diameter particles of lead ferrite.

C. Hot Pressing

The ferrite powder was loaded into a graphite die and then heated to 900°C in a graphite heating element furnace. Applied pressure was about 4,000 psi. The furnace atmosphere pressure ranged from 35 to about 350 microns during the hot pressing operation. The sample was held at temperature for about 15 minutes to effect sintering. The sample was cooled in the furnace, removed, and cored into smaller specimens which were later to be hot forged. Property measurements on the hot pressed sample gave the following results:

Density = 5.38 gm/cc
$B_s$ = 3,220 gauss
$B_r$ = 2,640 gauss
$H_c$ = 2,230 oersteds
$H_{ci}$ = 3,510 oersteds
$BH_{max}$ = 1.5 × 10$^6$ gauss · oersteds The material was a solid having an average grain size of about 0.2 micron with not more than 10 percent having a diameter greater than 0.5 micron.

D. Hot Forging

Samples cored from the hot pressed material were forged to different degrees. Strain rates on all of the forgings were kept constant at 10 percent/min. The forging temperature was 1,000°C. The forging atmosphere was air. The samples were placed in a cold furnace, the furnace then being heated to the forging temperature in 9 minutes. The samples were allowed to equilibrate for 15 minutes at temperature, then sufficient load was applied to deform the specimens at the required rate. The samples were cooled in air and removed from the furnace. Their properties were as follows:

| | | | |
|---|---|---|---|
| $(L-L_o)/L_o$, % | 50.5 | 61.4 | 71.6 |
| density, g/cc | 5.41 | 5.42 | 5.44 |
| $B_s$, gauss | 3800 | 3900 | 3850 |
| $B_r$, gauss | 3750 | 3900 | 3830 |
| $H_c$, oersteds | 2700 | 2650 | 2580 |
| $H_{ci}$, oersteds | 2800 | 2700 | 2620 |
| $BH_{max}$, gauss · oersteds | $3.4 \times 10^6$ | $3.7 \times 10^6$ | $3.6 \times 10^6$ |
| grain size, micron | ¾ | 1 | 1 |
| less than 10% larger than, microns | 1 | 1¼ | 1¼ |

Theoretical maximum density 5.57 grams/cc.

EXAMPLE II

Preparation of PbO·6Fe$_2$O$_3$ By Coprecipitation

A. Starting Material Preparation 87.9 grams of Pb(NO$_3$)$_2$ (which included 3.8 grams excess to compensate for the solubility at Pb(OH)$_2$ in the water of mixing and washing) and 1231.3 grams of Fe(NO$_3$)$_3$·9H$_2$O were dissolved in 4 liters of distilled water. This solution was precipitated to pH 9 with concentrated NH$_4$OH solution. The solution was allowed to stand overnight and the precipitate was filtered and washed with 24 liters of distilled water. The filter cake was dried at 50°C overnight and ground to 80 mesh.

B. Ferritization

The precipitated material after reaction at 800°C for 4 hours was examined and found to be comparable to spray dried material, both chemically and physically.

ILLUSTRATIVE EMBODIMENTS

Lead Ferrite Production

Fe(NO$_3$)$_3$·9H$_2$O and Pb(NO$_3$)$_2$ in the molar ratio of 12 to 1 are dissolved in water. This solution is atomized and passed through a tube heated to about 800°C. It has a residence time in the tube of about 2–3 minutes. The product of this spray-roasting treatment is a fine powder of mixed oxide. The powder particles are agglomerates of less than 0.02 micron grains of oxides. The powder is maintained at about 800°C for about 4 hours to permit the two metal oxides to react (ferritize). This powder is placed in a die and not-pressed at 10,000 psi and 800°C for 5 minutes to give a solid compact having a density of about 80 percent of theoretical maximum. This body would have grain structure wherein at least 90 percent of the crystals have diameters of from 0.05 to 1 micron. The average grain size would be about 0.5 micron. This body of material is placed between two plattens and hot forged at 25,000 psi and 850°C until a $(L - L_o)/L_o$ of about 0.6 is achieved. This product would be a highly oriented ferrite, suitable for preparing excellent magnets.

Ferrite Production Using Sintering Instead of Hot Pressing

An experiment similar to Example I is carried out. Steps A and B are repeated. The ferrite powder of step B is formed into a pellet and maintained at 900°C for 0.5 hours to effect sintering. The resulting product would have a density about 60 percent of the theoretical maximum. It would have a crystal size distribution similar to that observed in Example I. When hot forged in accord with Example I it would yield dense oriented products, similar to hose obtained in Example I.

COMPARATIVE EXPERIMENTS

A series of comparative experiments were conducted to demonstrate certain critical features of the present invention.

A. Orientation Using a Cold Orienting Process

A sample of the PbO·5.8 Fe$_2$O$_3$ powder prepared in accord with Example III was cold oriented in a conventional manner using a 4,000 oersted magnetic field. This product was sintered with pressure and its magnetic properties were measured. It had a very low remanence, only 0.71 times its saturation magnetization.

B. Use of Too Severe Ferritizing Conditions

A series of samples were prepared in accord with Example I, the temperatures, times and pressures employed were varied. The following ferritizing conditions were found to give poor final products.

A sample of PBO·6Fe$_2$O$_3$ was ferritized for 32 hours at 800°C. After hot pressing at 950°C and 5,000 psi in accord with Example I, the sample had a low intrinsic coercive force (1,100 oersteds) therefore showing excessive grain growth.

C. Use of Too Severe Hot Forging Conditions

A PbO·6Fe$_2$O$_3$ sample was prepared in accordance with Example I. The hot forging conditions were varied. The following conditions were found to be too severe. When the sample was forged at 900°C and 4,000 psi until a 93 percent deformation $((L - L_o)/L_o)$ was achieved properties. It had a remanence of 3,460 gauss and normal and intrinsic coercive forces of 1,580 oersteds each.

We claim as our invention:

1. The process for preparing a metal ferrite of the formula PbO·nFe$_2$O$_3$ wherein $n$ has a value of from 3 to 6.5, and characterized as having an average crystallite size of not greater than 2.5 microns and at least about 90 percent crystallite orientation, which comprises the steps of:

a. preparing solid particles comprising intimate agglomerates of less than 0.1 micron grains of lead oxide and less than 0.1 micron grains of ferric oxide, having a molar ratio of ferric oxide to lead oxide of from 3:1 to 6.5:1;

b. maintaining the solid particles of agglomerated oxides at temperatures of from about 700°C to 1,000°C for a period from about 0.5 to about 24 hours thereby forming less than 0.5 micron average diameter crystallites of lead ferrite;

c. sintering the crystallites for not more than 2 hours at a temperature of from 750°C to 1,000°C into a solid ductile body having an average grain size of less than 0.5 micron; and d. hot forging the solid ductile body by applying a pressure of from 1,000 psi to 30,000 psi and a temperature of from 700°C to 1,050°C.

2. The process in accordance with claim 1 wherein in step (b) the temperature employed is in the range of from 750°C to 900°C and the heating period is a time of from 0.5 to 8 hours.

3. The process in accordance with claim 2 wherein in step (d) the temperature employed is in the range of 750°C to 1,000°C, the pressure is from about 3,000 psi to 20,000 psi and the time period for forging is from 0.1 minutes to 5 minutes.

4. The process in accordance with claim 1 wherein the sintering in step (c) is carried out in not more than 15 minutes while applying a pressure of from 1,000 to 30,000 psi.

5. The process in accordance with claim 4 wherein in step (d) the temperature employed is in the range of 800°C to 950°C, the pressure is from about 3,000 psi to 10,000 psi and the time period for forging is from 0.1 minute to 5 minutes.

6. The process in accordance with claim 5 wherein in step (c) the sintering is carried out in from 1 to 10 minutes at a temperature of from 800°C to 950°C and a pressure of from 3,000 psi to 10,000 psi.

7. In a process for preparing a solid ferrite body having oriented crystallites suitable for forming anisotropic ceramic magnets wherein substantial crystallite orientation is induced in the ferrite body by deforming the body with from 1,000 to 30,000 psi pressure at a temperature in the range of from about 700°C to about 1,050°C, the improvement which comprises hot forging a solid ductile ferrite body consisting essentially of ferric oxide and lead oxide in the molar ratio of from 5 to 6.5 moles of ferric oxide for each mole of lead oxide and composed of uniform ferrite grains, said grains having an average diameter of less than 0.7 micron with not more than 10 percent of said grains having diameters greater than about 1.0 micron.

8. The process in accordance with claim 7 wherein the average grain size of the body to be deformed is from 0.3 micron to 0.7 micron.

* * * * *